(12) United States Patent
Ku (10) Patent No.: US 10,309,760 B2
(45) Date of Patent: Jun. 4, 2019

(54) ANGLE OF ROTATION SENSOR, A LINEAR DISPLACEMENT SENSOR, A DOOR MOUNT MECHANISM, AND AN ELECTRICAL BRUSH

(71) Applicant: CANDY HOUSE INC., Palo Alto, CA (US)

(72) Inventor: Che-Ming Ku, Taichung (TW)

(73) Assignee: CANDY HOUSE INC., Palo Alto, CA (US)

( * ) Notice: Subject to any disclaimer, the term of this patent is extended or adjusted under 35 U.S.C. 154(b) by 230 days.

(21) Appl. No.: 15/117,124

(22) PCT Filed: Oct. 8, 2015

(86) PCT No.: PCT/US2015/504710
§ 371 (c)(1),
(2) Date: Aug. 5, 2016

(87) PCT Pub. No.: WO2016/057802
PCT Pub. Date: Apr. 14, 2016

(65) Prior Publication Data
US 2016/0341537 A1    Nov. 24, 2016

Related U.S. Application Data

(60) Provisional application No. 62/061,209, filed on Oct. 8, 2014, provisional application No. 62/068,698, filed on Oct. 26, 2014.

(51) Int. Cl.
*G01B 7/30* (2006.01)
(52) U.S. Cl.
CPC ..................... *G01B 7/30* (2013.01)

(58) Field of Classification Search
CPC ........................................................ G01B 7/30
(Continued)

(56) References Cited

U.S. PATENT DOCUMENTS

| | | | |
|---|---|---|---|
| 4,613,781 A | 9/1986 | Sanders | |
| 5,088,347 A * | 2/1992 | Wanlass | E05B 81/25 |
| | | | 192/84.951 |

(Continued)

FOREIGN PATENT DOCUMENTS

| | | | | |
|---|---|---|---|---|
| EP | 0296808 B1 | 2/2016 | | |
| GB | 2082329 A * | 3/1982 | ............... | G01B 7/30 |
| WO | WO 9411888 A1 * | 5/1994 | ............... | G01B 7/30 |

OTHER PUBLICATIONS

International Search Report, PCT/US15/054710, dated Feb. 12, 2016 (4 pages).

*Primary Examiner* — Christopher W Fulton
(74) *Attorney, Agent, or Firm* — Hamre, Schumann, Mueller & Larson, P.C.

(57) ABSTRACT

An angle of rotation sensor for measuring an angle of rotation of a rotatable object includes an electrically conductive band to be disposed onto the rotatable object and having two terminal ends which are spaced apart from each other and which are respectively applied with different voltages; an electrical brush in electrical contact with the electrically conductive band; and a voltage measuring device coupled to the electrical brush and measuring a divided voltage which is a voltage at a position of the electrically conductive band at which the electrical brush contacts. The angle of rotation of the rotatable object is associated with the divided voltage and the different voltages.

16 Claims, 11 Drawing Sheets

(58) Field of Classification Search
 USPC .......................................................... 33/1 PT
 See application file for complete search history.

(56) References Cited

U.S. PATENT DOCUMENTS

| | | | | |
|---|---|---|---|---|
| 5,457,368 | A | | 10/1995 | Jacobsen et al. |
| 5,657,544 | A | * | 8/1997 | Ota .................. G01D 5/165 |
| | | | | 33/1 N |
| 5,917,298 | A | * | 6/1999 | Miller .................. B60S 1/583 |
| | | | | 318/443 |
| 5,949,344 | A | * | 9/1999 | Yasuda ................ F16H 59/105 |
| | | | | 180/336 |
| 6,715,368 | B1 | * | 4/2004 | Toratani .................. B62D 6/10 |
| | | | | 73/862.22 |
| 7,308,765 | B2 | * | 12/2007 | Riepertinger .......... G01D 11/24 |
| | | | | 33/1 N |
| 2001/0034943 | A1 | | 11/2001 | Itomi |
| 2002/0146960 | A1 | | 10/2002 | Spencer |
| 2011/0131821 | A1 | * | 6/2011 | Goll ..................... B62D 15/022 |
| | | | | 33/1 PT |
| 2011/0260714 | A1 | * | 10/2011 | Kim ........................ G01B 7/30 |
| | | | | 324/207.15 |
| 2012/0124848 | A1 | * | 5/2012 | Kirchberger ......... G01D 5/2497 |
| | | | | 33/1 PT |
| 2012/0124849 | A1 | * | 5/2012 | Hiller ..................... G01D 5/248 |
| | | | | 33/1 PT |
| 2014/0265359 | A1 | | 9/2014 | Cheng et al. |
| 2015/0033566 | A1 | * | 2/2015 | Chen ........................ G01D 5/06 |
| | | | | 33/1 PT |
| 2017/0122007 | A1 | * | 5/2017 | Moon ................ E05B 47/0012 |

\* cited by examiner

ANGLE OF ROTATION SENSOR, A LINEAR DISPLACEMENT SENSOR, A DOOR MOUNT MECHANISM, AND AN ELECTRICAL BRUSH

CROSS-REFERENCE TO RELATED APPLICATION

This application claims priorities of U.S. Provisional Application No. 62/061,209, filed on Oct. 8, 2014, and No. 62/068,698 also filed on Oct. 26, 2014.

FIELD

The disclosure relates to an angle of rotation sensor, a door mount mechanism including the angle of rotation sensor and an electrical brush adapted for the angle of rotation sensor, more particularly to an angle of rotation sensor, a door mount mechanism and an electrical brush which saves computation time and power.

BACKGROUND

Electronic security systems have been available for a number of years. In recent years, electronic technology has been used in combination with a conventional door lock to result in a smart lock. A drawback of such smart lock is that it requires replacement of an existing lock, and the installation process of the smart lock is relatively complicated. The installation also requires specialized manual labour to use tools required for mounting the smart lock.

Accordingly, there is a smart lock that may be attached to an existing lock. One of the key elements of this kind of smart lock is to measure the angle of rotation of the smart lock or the existing lock for calibration and providing tolerance between the existing lock and an adaptor of the smart lock. However, to achieve this effect generally requires additional components like a feedback servo motor, a variable resister and a transmission system. An off-the-shelf component, i.e., a small servo motor, uses a DC motor mechanism and does not have any unit for measuring angle of rotation associated with the servo motor.

A stepping motor uses an optical encoder or magnetic encoder, which is expensive and consumes a lot of energy during operation. Optical recognition of the angle of rotation depends on complex calibrations, or otherwise an advanced system for implementing the same. Therefore, large computation time and power required to operate the smart lock is attributable to the device for measuring the angle of rotation associated with the smart lock. At the same time, dimensions and production cost of the smart lock increase. Consequently, there is a need for improved approaches for measuring the angle of rotation.

SUMMARY

Therefore, an object of the disclosure is to provide an angle of rotation sensor, a door mount mechanism and an electrical brush which save computation time and power for measuring an angle of rotation while maintaining reasonable dimensions and production cost.

According to a first aspect of the disclosure, the angle of rotation sensor is configured for measuring an angle of rotation of a rotatable object. The angle of rotation sensor includes an electrically conductive band, an electrical brush and a voltage measuring device. The electrically conductive band is to be disposed onto the rotatable object for surrounding the rotatable object, and has two terminal ends which are spaced apart from each other and which are constantly and respectively applied with different voltages when the electrically conductive band rotates along with the rotatable object. The electrical brush is in electrical contact with the electrically conductive band when the electrically conductive band rotates along with the rotatable object. The voltage measuring device is coupled to the electrical brush and measures a divided voltage which is a voltage of a position of the electrically conductive band at which the electrical brush contacts. The angle of rotation of the rotatable object is associated with the divided voltage and the different voltages respectively applied to the two terminal ends of the electrically conductive band.

According to a second aspect of the disclosure, the door mount mechanism is configured for a smart lock system. The door mount mechanism is adapted to be mounted onto a door for rotating a thumb turn of a door lock which is mounted on the door. The door mount mechanism includes a casing, a rotatable component, an intermediate coupling and an angle of rotation sensor. The casing has a door-mounting end that is adapted for abutting against the door, and defines a receiving space that is adapted for receiving the door lock, and that has an opening at the door-mounting end and adapted for extension of the door lock therethrough. The rotatable component is coupled rotatably to the casing. The intermediate coupling is connected co-rotatably to the rotatable component and is adapted for driving rotation of the thumb turn of the door lock such that the thumb turn is co-rotatable with the rotatable component. The angle of rotation sensor is configured for measuring an angle of rotation of the intermediate coupling.

The angle of rotation sensor includes an electrically conductive band, an electrical brush and a voltage measuring device. The electrically conductive band is disposed onto the intermediate coupling for surrounding the intermediate coupling, and has two terminal ends which are spaced apart from each other and which are constantly and respectively applied with different voltages when the electrically conductive band rotates along with the intermediate coupling. The electrical brush is in electrical contact with the electrically conductive band when the electrically conductive band rotates along with the intermediate coupling. The voltage measuring device is coupled to the electrical brush and measures a divided voltage which is a voltage of a position of the electrically conductive band at which the electrical brush contacts. The angle of rotation of the intermediate coupling is associated with the divided voltage and the different voltages respectively applied to the two terminal ends of the electrically conductive band.

According to a third aspect of the disclosure, the electrical brush includes at least one contact which includes a base, a resiliently deformable connecting portion, a contacting portion, a confining portion and a tongue portion. The resiliently deformable connecting portion extends from the base, and curves to extend inclinedly with respect to the base. The contacting portion extends from the resiliently deformable connecting portion, and abuts against an electrically conductive band by a resilient force of the resiliently deformable connecting portion. The confining portion extends perpendicularly to the base and is formed with a confining slot. The tongue portion extends from the contacting portion and extends through the confining slot of the confining portion for limiting movement of the contacting portion.

According to a fourth aspect of this disclosure, a linear displacement sensor for measuring linear displacement of a movable object includes an electrically conductive band, an electrical brush and a voltage measuring device. The electrically conductive band is to be disposed onto a surface of the movable object, and has two terminal ends which are spaced apart from each other and which are constantly and respectively applied with different voltages when the electrically conductive band moves along with the movable object. The electrical brush is in electrical contact with the electrically conductive band when the electrically conductive band moves along with the movable object. The voltage measuring device is coupled to the electrical brush and measuring a divided voltage which is a voltage at a position of the electrically conductive band at which the electrical brush contacts. The linear displacement of the movable object is associated with the divided voltage and the different voltages respectively applied to the two terminal ends of the electrically conductive band.

BRIEF DESCRIPTION OF THE DRAWINGS

Other features and advantages of the disclosure will become apparent in the following detailed description of the embodiments with reference to the accompanying drawings, of which.

DETAILED DESCRIPTION

As shown in FIGS. 1 to 4, an embodiment of a door mount mechanism, e.g., a smart lock, according to the disclosure is adapted for use in a smart lock system, and is adapted to be mounted onto a door (not shown) for rotating a thumb turn (not shown) of a door lock (not shown). The door lock includes a base plate (not shown) which is mounted on the door and on which the thumb turn is rotatably disposed. The door mount mechanism includes a casing 1, a rotatable component 2, an actuating unit 3 and an intermediate coupling 4.

Figure 1:
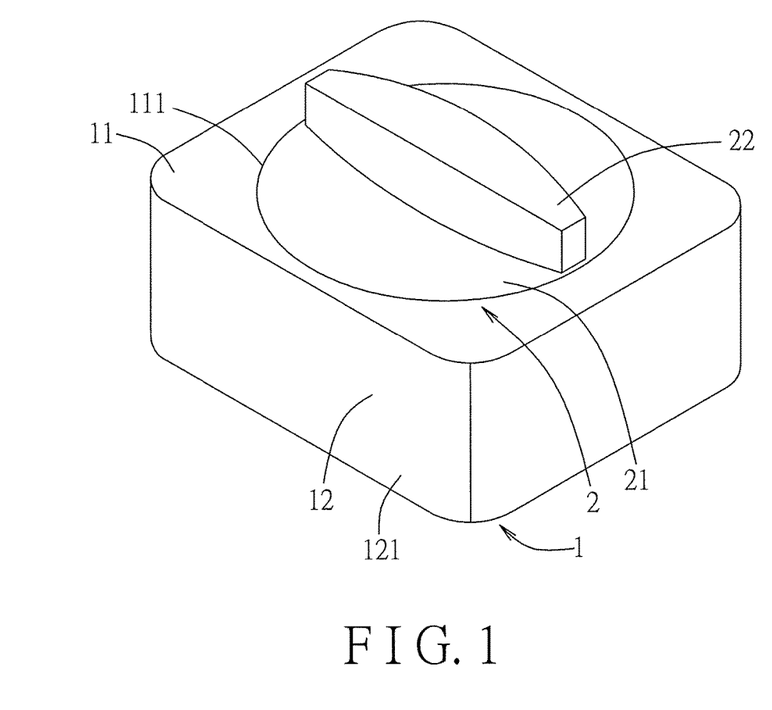
FIG. 1 is a perspective view of an embodiment of a door mount mechanism according to the disclosure.

The casing 1 includes a base wall 11, a surrounding wall 12 extending from a periphery of the base wall 11 and cooperating with the base wall 11 to define a receiving space. In this embodiment, the base wall 11 is substantially square. The surrounding wall 12 has a door-mounting end 121, and the receiving space has an opening at the door-mounting end 121 and adapted for extension of the door lock therethrough. In this embodiment, the base wall 11 is formed with a round hole 111.

Figure 2:
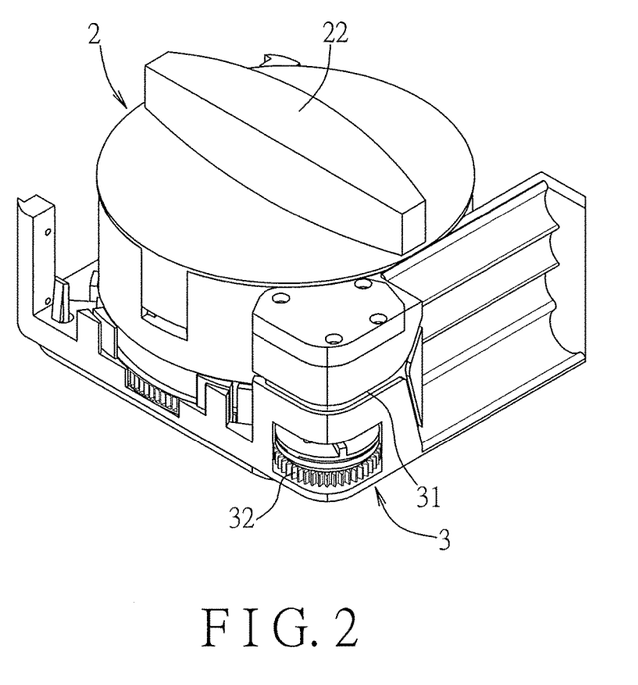
FIG. 2 is a perspective view of a rotatable component and an actuating unit of the embodiment of the door mount mechanism.
Figure 3:
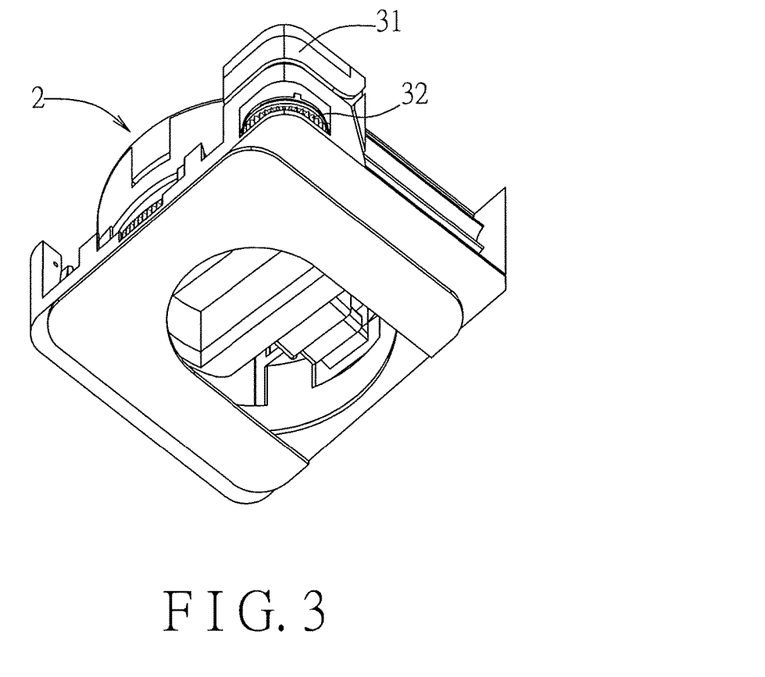
FIG. 3 is another perspective view of the rotatable component and the actuating unit of the embodiment of the door mount mechanism.

The rotatable component 2 is coupled rotatably to the casing 1. The rotatable component 2 has a base portion 21 engaging rotatably the round hole 111 of the casing 1, and a knob portion 22 projecting from the base portion 21 away from the receiving space and being accessible to a user.

The actuating unit 3 includes an actuating module 31 that includes a motor and a solenoid valve, and a gear set 32 that is driven rotatably by the motor of the actuating module 31. The actuating unit 3 is connected to a control circuit (not shown). During operation of the smart lock system, the control circuit receives commands from a user device, such as a mobile phone, and the actuating unit 3 is activated by signals received from the control circuit to operate to drive rotation of the rotatable component 2.

The door mount mechanism is a universal mechanism to accommodate various configurations of existing door lock. The universal mechanism is robust such that it permits some range of misalignment between the existing door lock and the door mount mechanism. For example, most door locks are designed to be locked/unlocked by turning the thumb turn by ninety degrees (clockwise/counterclockwise), but in reality, the rotational angle required to lock/unlock is not exactly ninety degrees. It may be either more than 90 degrees or less than 90 degrees. Therefore, the door mount mechanism is adaptable for any rotational angle that is not exactly ninety degrees. In another embodiment, the door mount mechanism is adaptable to thumb turn's asymmetry to a shaft (not shown) and the shaft's eccentricity to the base plate.

Figure 4:
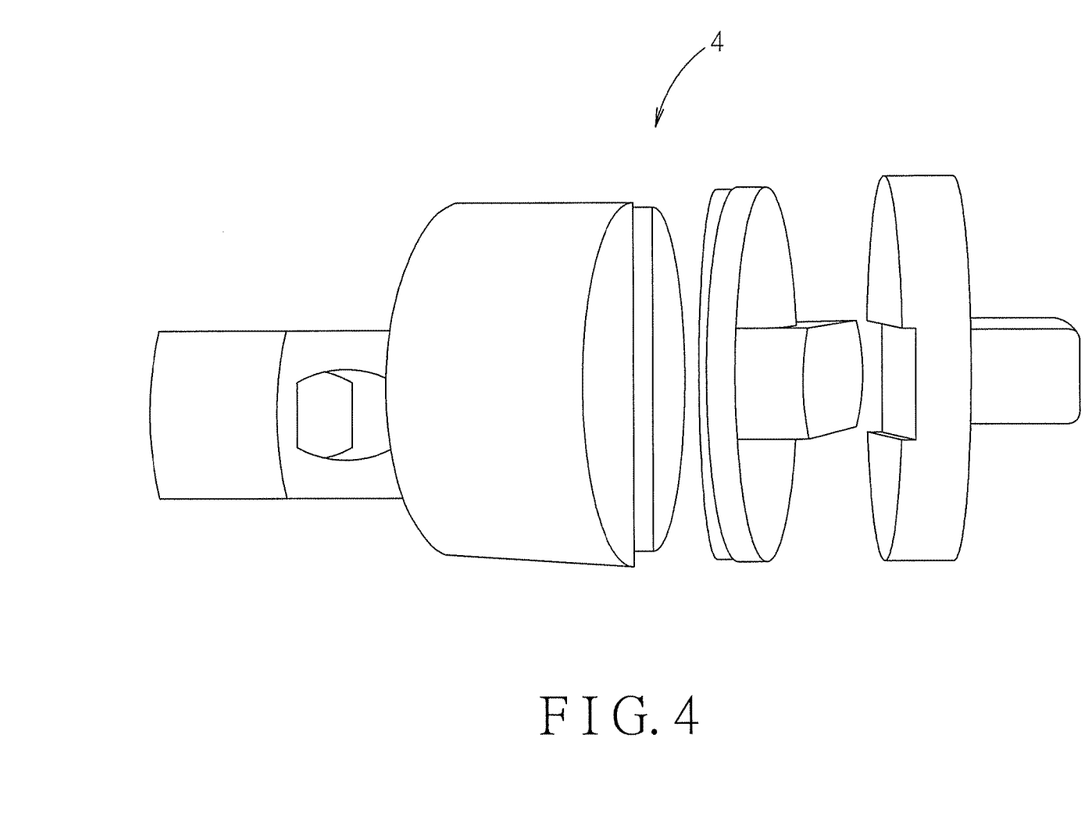
FIG. 4 is an exploded perspective view of an Oldham coupling.
Figure 5:
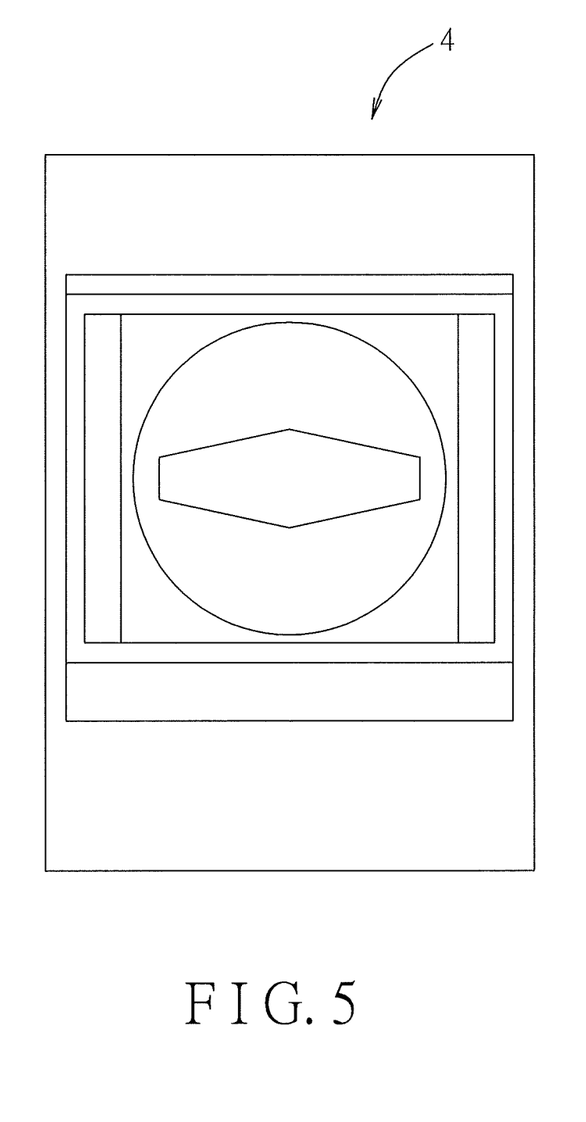
FIG. 5 is a schematic view of tongue-and-groove mechanisms.

The door mount mechanism for the smart lock system is especially suitable for activating the thumb turn of a door lock for use in a house or an apartment. Further, the door mount mechanism can be easily assembled and disassembled by a user. The intermediate coupling 4 is adapted for driving rotation of the thumb turn of the door lock such that the thumb turn is co-rotatable with the rotatable component 2. The door mount mechanism uses the intermediate coupling 4 to increase the fit across various types of thumb turns of door locks available on the market. For example, the intermediate coupling 4 is one of an Oldham coupling, and tongue-and-groove mechanisms in combination with a rotational plate. However, other types of the intermediate coupling 4 may be used to mitigate or correct misalignments, asymmetry and eccentricity, such as rubber, sponge or a robotic finger. The usage of the intermediate coupling 4 increases the tolerance for misalignment, asymmetry, eccentricity between the existing door lock and the door mount mechanism. The use of the Oldham coupling is illustrated in FIG. 4. The use of the tongue-and-groove mechanisms in combination with the rotational plate is illustrated in FIG. 5.

Figure 6:
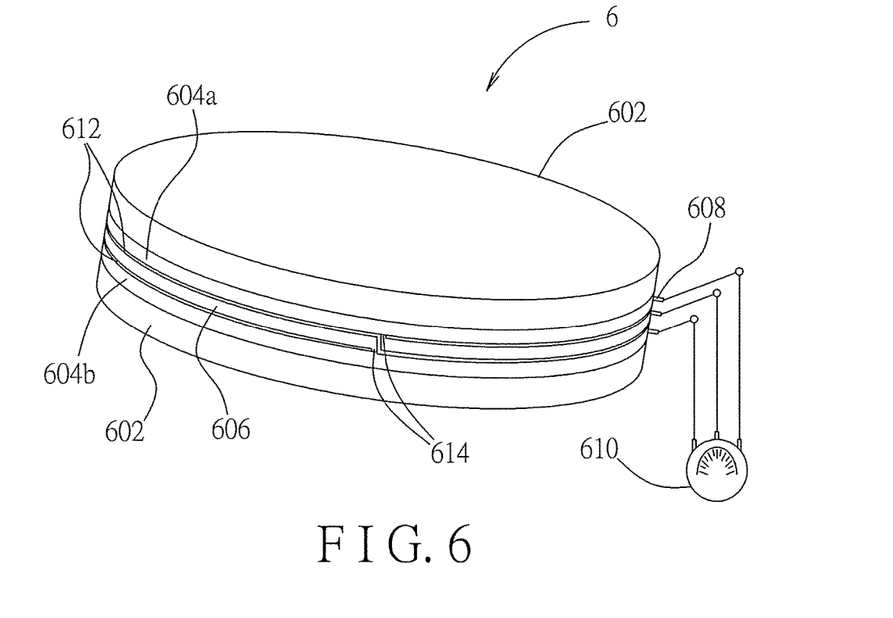
FIG. 6 is a schematic view of an embodiment of an angle of rotation sensor according to the disclosure.

Referring to FIG. 6, the embodiment of the door mount mechanism according to this disclosure further includes an angle of rotation sensor 6 for measuring an angle of rotation of a rotatable object (e.g., associated with at least one of the rotatable component 2, the actuating unit 3 and the intermediate coupling 4 of the door mount mechanism). The angle of rotation thus measured facilitates determination of a state of the door mount mechanism, such as a locked state, a single lock state, a double lock state and an unlocked state. The angle of rotation sensor 6 includes at least one mixture of conductivity materials. Variation in voltage thus measured is used to determine the angle of rotation. Specifically, in the embodiment shown in FIG. 6, the angle of rotation sensor 6 is attached to a rotatable circular insulating plate 602 which is a portion of the rotatable component 2. In another embodiment, the circular insulating plate 602 may be a part of the intermediate coupling 4 of the door lock mechanism. The angle of rotation sensor 6 includes an electrically conductive band 606 and two electrically conductive loops 604a and 604b. The electrically conductive band 606 is disposed onto a periphery of the circular insulating plate 602 for surrounding the same, and has two terminal ends which are spaced apart from each other and which are constantly and respectively applied with different voltages when the electrically conductive band 606 rotates along with the circular insulating plate 602. The two electrically conductive loops 604a and 604b are disposed onto the periphery of the circular insulating plate 602 for encircling the same, are arranged in a manner that the electrically conductive band 606 is sandwiched between the two electrically conductive loops 604a and 604b, and are connected electrically and respectively to the two terminal ends of the electrically conductive band 606. The electrically conductive band 606 is made of a first electrically resistive material, such as aluminum or carbon. The two electrically conductive loops 604a and 604b are made of a same second electrically resistive material, such as copper. The first electrically resistive material has electrical resistivity greater than that of the second electrically resistive material.

Figure 7:
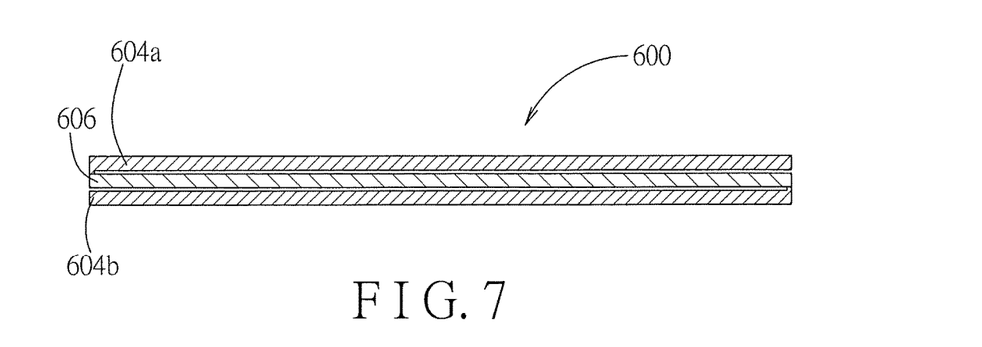
FIG. 7 is a schematic view of an electrically conductive band and the two electrically conductive loops.

Referring to FIG. 7, the electrically conductive band 606 and the two electrically conductive loops 604a and 604b are illustrated more clearly. Specifically, the electrically conductive band 606 and the two electrically conductive loops 604a and 604b are connected in series.

Referring back to FIG. 6, the angle of rotation sensor 6 further includes an electrical brush 608 and a voltage measuring device 610. The electrical brush 608 is in electrical contact with the electrically conductive band 606 when the electrically conductive band 606 is rotating along with the circular insulating plate 602. The voltage measuring device 610 is coupled to the electrical brush 608 and measures a divided voltage which is a voltage at a position of the electrically conductive band 606 at which the electrical brush 608 contacts. Preferably, the voltage measuring device 610 in this embodiment is a potentiometer. The angle of rotation of the circular insulating plate 602 is associated with the divided voltage and the different voltages respectively applied to the two terminal ends of the electrically conductive band 606.

Specifically, the electrical brush 608 includes a detection contact which is in electrical contact with the electrically conductive band 606 when the electrically conductive band 606 is rotating along with the circular insulating plate 602 for allowing measurement of the divided voltage by the voltage measuring device 610. The electrical brush 608 further includes two voltage applying contacts which are in electrical contact with the two electrically conductive loops 604a and 604b, respectively, when the electrically conductive loops 604a and 604b are rotating along with the circular insulating plate 602, and which are provided respectively with the different voltages (e.g., 0V and 5V) for allowing constant application of the different voltages upon the two terminal ends of the electrically conductive band 606. This three-contact design makes mechanism of the electrical brush 608 simpler. Preferably, each of the electrically conductive band 606 and the two electrically conductive loops 604a and 604b are coated with a wear-resistive material so as to mitigate abrasions thereon resulting from friction with the contacts of the electrical brush 608.

Moreover, the angle of rotation sensor 6 further includes two dielectric bands 612, each of which is disposed onto the circular insulating plate 602 for encircling the same, and each of which is arranged between a corresponding one of the two electrically conductive loops 604a, 604b and the electrically conductive band 606 for electrical insulation therebetween. The angle of rotation sensor 6 further includes two electrical connectors 614, each of which crosses over a respective one of the dielectric bands 612, and each of which interconnects a respective one of the two terminal ends of the electrically conductive band 606 and a corresponding one of the two electrically conductive loops 604a or 604b. In this way, the detection contact of the electrical brush 608 which contacts the position of the electrically conductive band 606 in combination with the electrically conductive band 606 serves as a voltage divider. The electrical conductors 614 which are coupled to the two terminal ends are in electrical connection to the 0V and 5V of the potentiometer, respectively. For example, the electrically conductive band 606 is made of the first electrically resistive material and has resistance of 200K ohms. When the electrically conductive loops 604a and 604b are respectively applied with voltages 0V and 5V, at 90 degrees of rotation, the divided voltage measured from the position of the electronically conductive band 606 at which the detection contact of the electrical brush 608 is located is 1.25V. That is to say, the angle of rotation of the circular insulating plate 602 is associated with a ratio of the divided voltage to a difference between the different voltages respectively applied to the two terminal ends of the electrically conductive band 606. Therefore, by measuring the voltage at a specified position, the angle of rotation can be determined.

In other words, the angle of rotation sensor 6 includes the detection contact of the electrical brush 608 which may be regarded as a sliding or rotating contact that cooperates with the electrically conductive band 606 to form an adjustable voltage divider. The detection contact of the electrical brush 608 in combination with one of the two terminal ends of the electrically conductive band 606 may serve as a wiper and one terminal end, respectively, so as to act as a variable resistor or rheostat. When a current passes through the detection contact of the electrical brush 608, the electrically conductive band 606 and one of the two electrically conductive loops 604a or 604b, the change in voltage due to rotation is measured to determine the angle of rotation.

Figure 8:
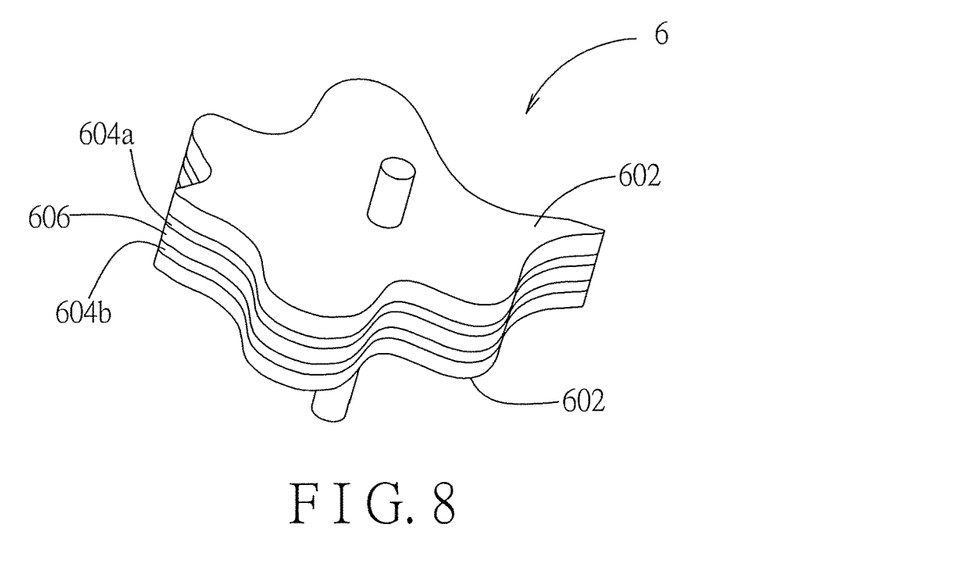
FIG. 8 is a perspective view of a variation of the embodiment of the angle of rotation sensor with an irregular shaped circular insulating plate.

It is noted that, the angle of rotation sensor 6 is applicable for any shape of a rotatable object, or for any shape of the rotatable object defined by known angular coordinates (i.e., theta) and radius coordinates (i.e., r) in the polar coordinates system as shown in FIG. 8. The electrically conductive band 606 and the electrically conductive loops 604a and 604b which are disposed onto the rotatable object that has an irregular shape are shown more clearly in FIG. 7. The angle of rotation can be calibrated according to the known angular coordinates, theta, so as to be measured. However, with only one combination of the electrically conductive band 606 and the electrically conductive loops 604a and 604b, the radius coordinates, r, is not explicitly calculated. Further, two appropriately arranged combinations of the electrically conductive band 606 and the electrically conductive loops 604a and 604b may be used to measure spherical polar angle and azimuthal angle as well.

It should be appreciated that the construction shown in FIG. 7, in cooperation with the electrical brush 608 and the voltage measuring device 610, may also be utilized to constitute a linear displacement sensor for measuring linear displacement of a movable object if adhered to a surface of the movable object. An absolute position of a movable object may also be detected adopting this or a similar mechanism.

Figure 9:
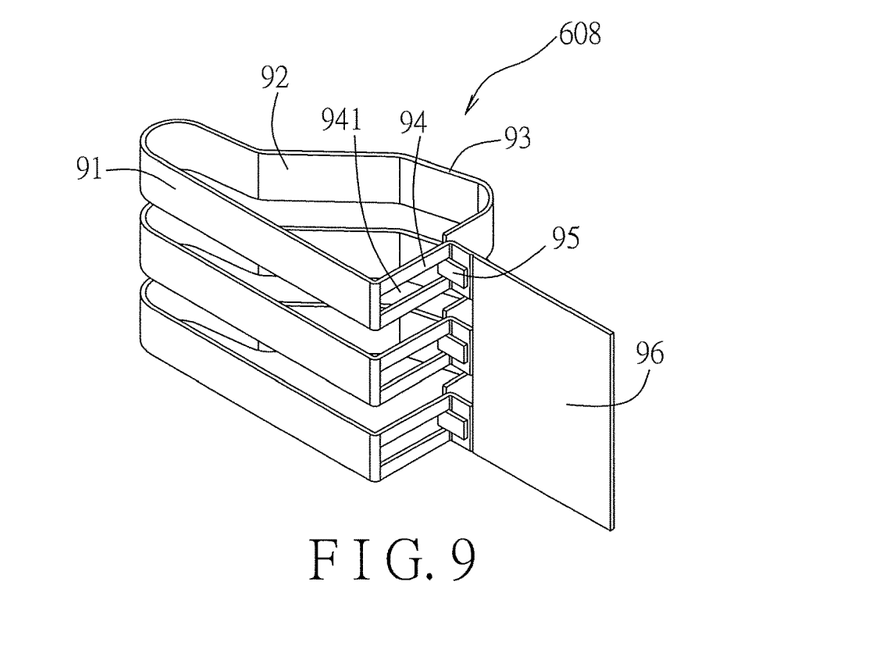
FIG. 9 is a perspective view of an electrical brush of the embodiment of the angle of rotation sensor according to the disclosure.
Figure 10:
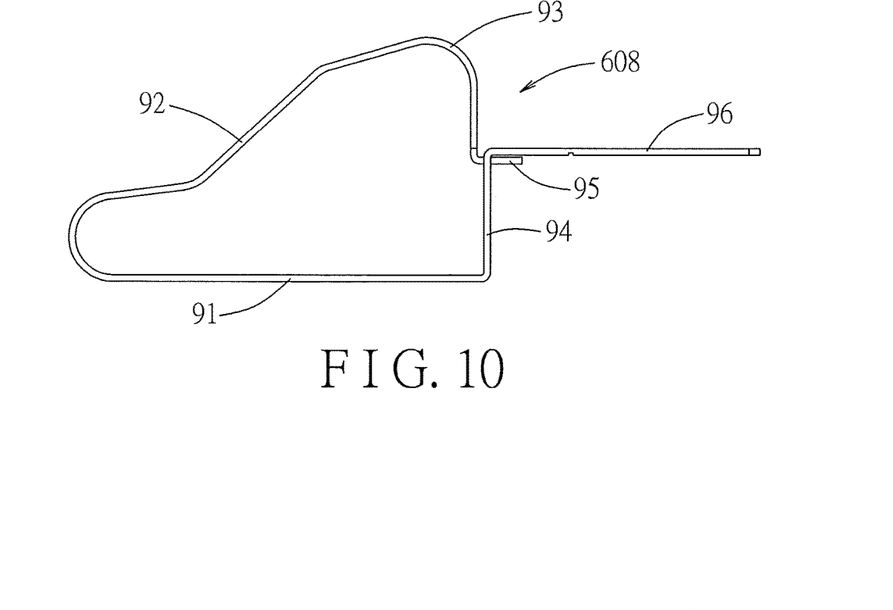
FIG. 10 is a top schematic view of the electrical brush shown in FIG. 9.

Referring to FIGS. 9 and 10, an embodiment of the electrical brush 608 is illustrated. Each of the detection contact and the voltage applying contacts of the electrical brush 608 includes a base 91, a resiliently deformable connecting portion 92, a contacting portion 93, a confining portion 94 and a tongue portion 95. The resiliently deformable connecting portion 92 extends from the base 91, and curves to extend inclinedly with respect to the base 91. The contacting portion 93 extends from the resiliently deformable connecting portion 92, and abuts against a respective one of the electrically conductive band 606 and the electrically conductive loops 604a and 604b by a resilient force of the resiliently deformable connecting portion 92. The confining portion 94 extends perpendicularly to the base 91 and is formed with a confining slot 941. The tongue portion 95 extends from the contacting portion 93, extends through the confining slot 941 of the confining portion 94, and is slidable along the confining slot 941 for limiting movement of the contacting portion 93.

During manufacture of the electrical brush 608, the electrical brush 608 further includes a holding portion 96 which extends from the confining portion 94 of each of the detection contact and the voltage applying contacts for facilitating precise positioning and installation of the electrical brush 608. Interconnection between the holding portion 96 and the confining portion 94 is broken after the electrical brush 608 is positioned and installed.

Figure 11:
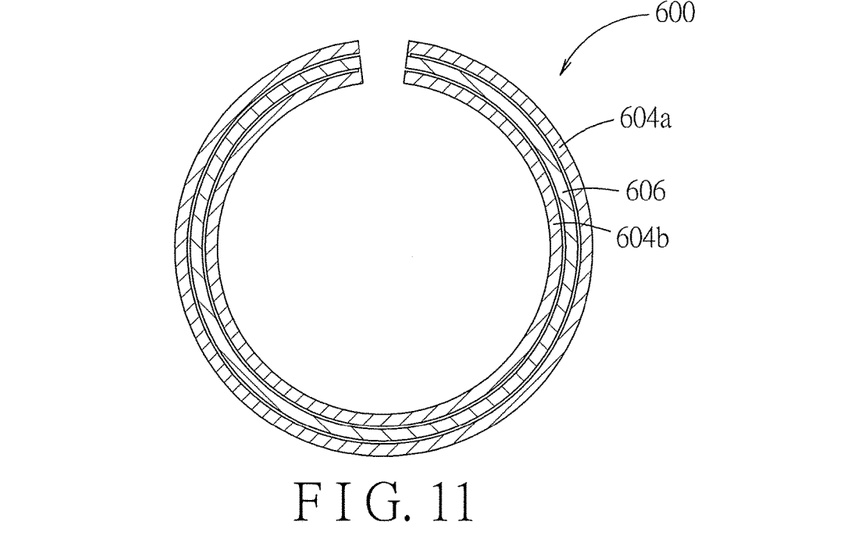
FIG. 11 is a schematic view of another implementation of the electrically conductive band and the two electrically conductive loops.

Accordingly, mass production of the angle of rotation sensor 6 may be realized with ease. The electrically conductive band 606 and the electrically conductive loops 604a and 604b are slimly printed or electroplated on a flexible plastic strip. A printed or electroplated pattern is shown in FIG. 7. The flexible plastic strip is then pasted to surround the circular insulating plate 602. Another exemplary implementation of the electrically conductive band 606 and the electrically conductive loops 604a and 604b is shown in FIG. 11, which can be pasted to, e.g., a flat face of the circular insulating plate 602.

The angle of rotation sensor 6 facilitates calibration of the door mount mechanism of the smart lock system when the door mount mechanism is installed on the existing door lock with the thumb turn. The angle of rotation sensor 6 may be manufactured with ease, has compact dimensions, and is relatively cheap and power efficient. Further, the design of the angle of rotation sensor 6 saves computation time, and is flexibly adaptable for various shapes and forms of rotatable objects.

With the design of the angle of rotation sensor 6 which simulates a voltage divider, the accuracy of measurement of the angle of rotation will not be affected due to the resistance of the electrically conductive band 606 varying with temperature. Information regarding an absolute angle value or position value can be obtained immediately. To save energy, the angle or position detection may be executed once per one or more micro-seconds.

In addition, to minimize the installation effort, the door mount mechanism of this disclosure is combined with a user experience application flow such that installation of the door mount mechanism is non-intrusive and under 3 seconds. There is no need for the use of a screwdriver or any tool. No measurement is required by the user. Each unit of the door mount mechanism is calibratable by itself, and is fault tolerant during the installation of the door mount mechanism. When the user attaches the door mount mechanism to the door, the user does not need to pay any attention to the following installation details including: an installation angle of the door mount mechanism, a direction of misalignment between the rotation centre of the thumb turn and the rotation centre of the door mount mechanism, the misalignment between the rotation centre of the thumb turn and the rotation centre of the door mount mechanism, a profile/shape of the thumb turn. The door mount mechanism is easily attached to the door like pasting a photo onto the wall. The door mount mechanism and installation process are provided with fool-proof design. Physical parameters of installation errors are allowed by this disclosure, such as misalignment, asymmetry, eccentricity between the original locking system and the disclosed door mount mechanism.

Figure 12:
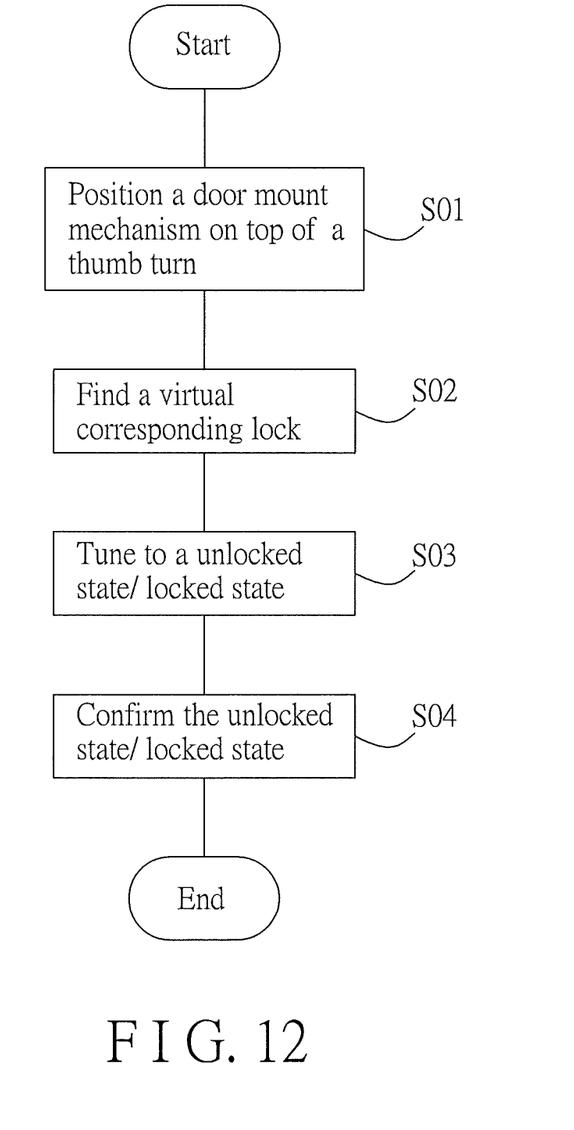
FIG. 12 is a flow chart of a procedure that enables non-intrusive installation and self-calibration of the door mount mechanism.

FIG. 12 is a flow chart of a procedure that enables non-intrusive installation and self-calibration of the door mount mechanism. The process 500 describes the steps of the non-intrusive installation and self-calibration of door mount mechanism. In step S01, the door mount mechanism is positioned on top of the thumb turn and the base plate. The door mount mechanism can be attached to the door surface via a plurality of methods, mechanically or with adhesives. In step S02, a virtual corresponding lock is found on an application program, e.g., mobile or web interface. In step S03, the application is tuned to the unlocked state first, and the unlocked state is virtually confirmed in step S04. During confirmation, configurations (e.g., the angle of rotation) of the door mount mechanism thus measured are communicated via a variety of communication methods. The steps S03 and S04 are repeated for the locked state. The sequence of these steps is exemplary only, and these steps may be implemented using various corresponding sequences.

Figure 13:
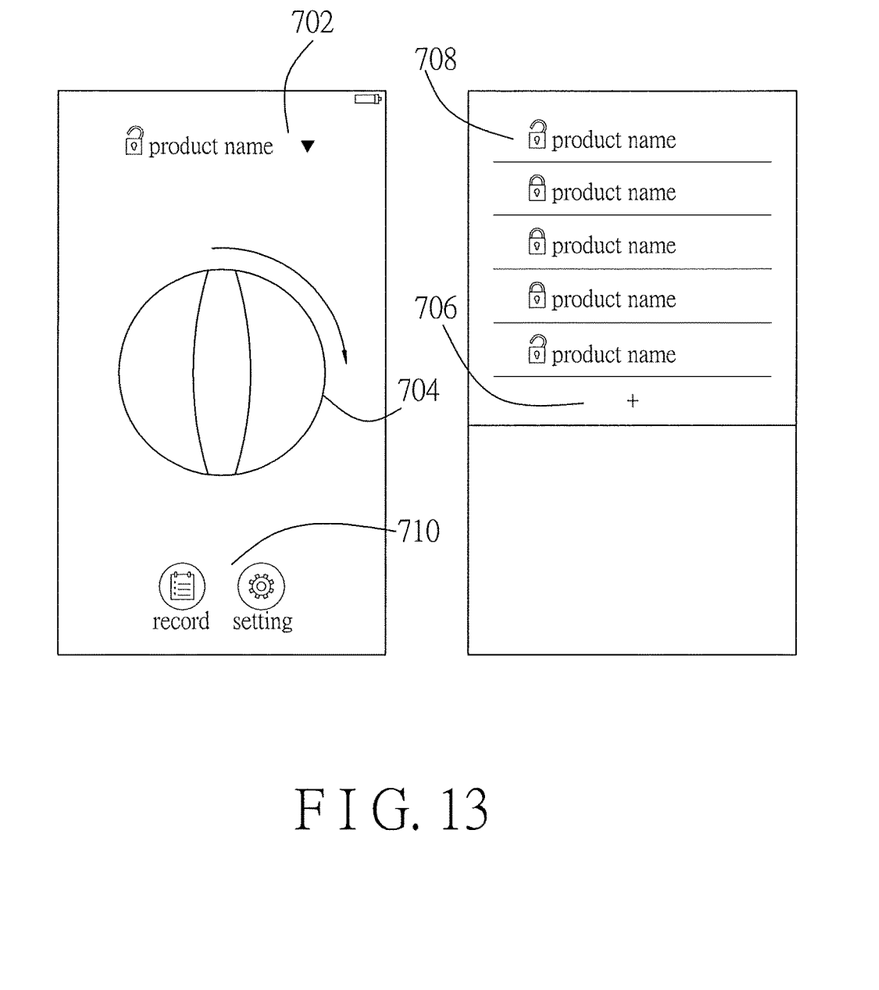
FIGS. 13 and 14 are user interfaces which provide calibration functionality of the door mount mechanism.
Figure 14:
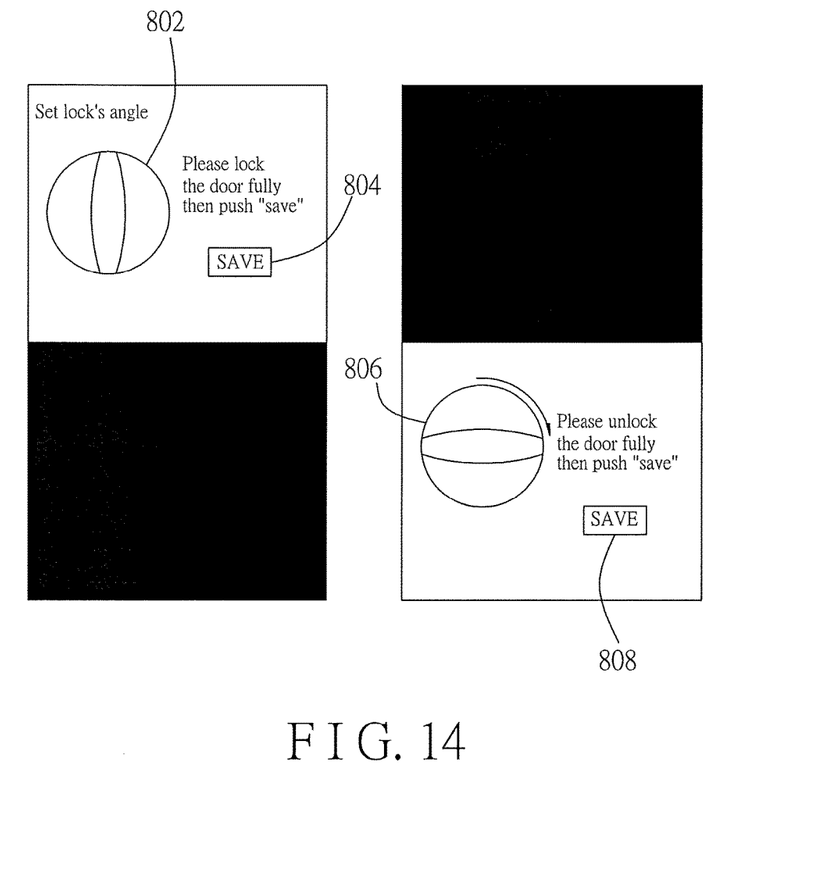

FIGS. 13 and 14 illustrate non-intrusive and self-calibration user experience of the door mount mechanism (e.g., a user interface) in one embodiment of this disclosure. Element 702 allows the identification and the naming of the door mount mechanism. Element 708 allows the user to switch between door mount mechanisms. Element 706 allows for additional door mount mechanisms to be identified. Element 704 virtually displays synchronization with the actual position of the corresponding physical lock position. Button 710 allows users to proceed to the self-calibration stage. User is prompted by the user interface to turn the door mount mechanism to the locked state. Element 802 virtually displays the corresponding physical lock position of the door lock. Button 804 virtually saves the lock position and proceeds to the unlock position configuration. The user is then prompted to turn the door mount mechanism to the unlocked state. Element 806 virtually displays the unlock position. Button 808 virtually saves the lock position. The self-calibration process is then complete.

To sum up, by means of the electrical brush 608 in electrical contact with the electrically conductive band 606 whose two terminal ends are respectively applied with the different voltages when the electrically conductive band 606 rotates along with the circular insulating plate 602, the divided voltage may be measured by the voltage measuring device 610. In this way, the angle of rotation may be obtained according to the divided voltage and the different voltages respectively applied to the two terminal ends of the electrically conductive band 606.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An angle of rotation sensor for measuring an angle of rotation of a rotatable object, the angle of rotation sensor comprising:
   an electrically conductive band configured to be disposed onto the rotatable object for surrounding the rotatable object, and having two terminal ends which are spaced apart from each other and which are constantly and respectively applied with different voltages when said electrically conductive band rotates along with the rotatable object;
   two electrically conductive loops which are to be disposed onto the rotatable object for encircling the rotatable object, which are arranged in a manner that said electrically conductive band is sandwiched between said two electrically conductive loops, and which are connected electrically and respectively to said two terminal ends of said electrically conductive band;
   an electrical brush being in electrical contact with said electrically conductive band when said electrically conductive band rotates along with the rotatable object; and
   a voltage measuring device coupled to said electrical brush and measuring a divided voltage which is a voltage at a position of said electrically conductive band at which said electrical brush contacts, the angle of rotation of the rotatable object being associated with the divided voltage and the different voltages respectively applied to said two terminal ends of said electrically conductive band.

2. The angle of rotation sensor according to claim 1, wherein said electrical brush includes:
   a detection contact which is in electrical contact with said electrically conductive band when said electrically conductive band rotates along with the rotatable object for allowing measurement of the divided voltage by said voltage measuring device; and
   two voltage applying contacts which are in electrical contact with said two electrically conductive loops, respectively, when said electrically conductive loops rotate along with the rotatable object, and which are provided respectively with the different voltages for allowing constant application of the different voltages upon said two terminal ends of said electrically conductive band.

3. The angle of rotation sensor according to claim 1, further comprising:
   at least one dielectric band which is to be disposed onto the rotatable object for encircling the rotatable object, and which is arranged between one of said two electrically conductive loops and said electrically conductive band for electrical insulation therebetween; and
   at least one electrical connector which crosses over said dielectric band and which interconnects a corresponding one of said two terminal ends of said electrically conductive band and the one of said two electrically conductive loops.

4. The angle of rotation sensor according to claim 1, wherein said electrically conductive band is made of a first electrically resistive material, and said two electrically conductive loops are made of a same second electrically resistive material, the first electrically resistive material having electrical resistivity greater than that of the second electrically resistive material.

5. The angle of rotation sensor according to claim 4, wherein the first electrically resistive material is carbon, and the second electrically resistive material is copper.

6. The angle of rotation sensor according to claim 1, wherein each of said electrically conductive band and said two electrically conductive loops are coated with a wear-resistive material.

7. The angle of rotation sensor according to claim 1, wherein said electrical brush includes:
   a base;
   a resiliently deformable connecting portion which extends from said base, and which curves to extend inclinedly with respect to said base;
   a contacting portion which extends from said resiliently deformable connecting portion, and which abuts against said electrically conductive band by a resilient force of said resiliently deformable connecting portion;
   a confining portion which extends perpendicularly to said base and which is formed with a confining slot; and
   a tongue portion which extends from said contacting portion and which extends through said confining slot of said confining portion for limiting movement of said contacting portion.

8. The angle of rotation sensor according to claim 1, wherein said voltage measuring device is a potentiometer.

9. The angle of rotation sensor according to claim 1, wherein the angle of rotation of the rotatable object is associated with a ratio of the divided voltage to a difference between the different voltages respectively applied to said two terminal ends of said electrically conductive band.

10. A door mount mechanism for a smart lock system, said door mount mechanism being adapted to be mounted onto a door for rotating a thumb turn of a door lock which is mounted on the door, said door mount mechanism comprising:
    a casing having a door-mounting end that is adapted for abutting against the door, and defining a receiving space that is adapted for receiving the door lock, and that has an opening at said door-mounting end and adapted for extension of the door lock therethrough;
    a rotatable component coupled rotatably to said casing;
    an intermediate coupling connected co-rotatably to said rotatable component and adapted for driving rotation of the thumb turn of the door lock such that the thumb turn is co-rotatable with said rotatable component; and
    an angle of rotation sensor for measuring an angle of rotation of said rotatable component, the angle of rotation sensor including an electrically conductive band disposed onto said rotatable component for surrounding said rotatable component, and having two terminal ends which are spaced apart from each other and which are constantly and respectively applied with different voltages when said electrically conductive band rotates along with said rotatable component;
    two electrically conductive loops which are disposed onto said rotatable component for encircling said rotatable component, which are arranged in a manner that said electrically conductive band is sandwiched between said two electrically conductive loops, and which are connected electrically and respectively to said two terminal ends of said electrically conductive band;
an electrical brush being in electrical contact with said electrically conductive band when said electrically conductive band rotates along with said rotatable component; and
a voltage measuring device coupled to said electrical brush and measuring a divided voltage which is a voltage at a position of said electrically conductive band at which said electrical brush contacts, the angle of rotation of said rotatable component being associated with the divided voltage and the different voltages respectively applied to said two terminal ends of said electrically conductive band.

11. The door mount mechanism according to claim 10, wherein said electrical brush of said angle of rotation sensor includes:
a detection contact which is in electrical contact with said electrically conductive band when said electrically conductive band rotates along with said rotatable component for allowing measurement of the divided voltage by said voltage measuring device; and
two voltage applying contacts which are in electrical contact with said two electrically conductive loops, respectively, when said electrically conductive loops rotate along with said rotatable component, and which are provided respectively with the different voltages for allowing constant application of the different voltages upon said two terminal ends of said electrically conductive band.

12. The door mount mechanism according to claim 10, wherein said angle of rotation sensor further includes:
at least one dielectric band which is disposed onto said rotatable component for encircling said rotatable component, and which is arranged between one of said two electrically conductive loops and said electrically conductive band for electrical insulation therebetween; and
at least one electrical connector which crosses over said dielectric band and which interconnects a corresponding one of said two terminal ends of the one of said two electrically conductive loops and said electrically conductive band.

13. The door mount mechanism according to claim 10, wherein said electrically conductive band is made of a first electrically resistive material, and said two electrically conductive loops are made of a same second electrically resistive material, the first electrically resistive material having electrical resistivity greater than that of the second electrically resistive material.

14. The door mount mechanism according to claim 13, wherein the first electrically resistive material is carbon, and the second electrically resistive material is copper.

15. The door mount mechanism according to claim 10, wherein said electrical brush of said angle of rotation sensor includes:
a base;
a resiliently deformable connecting portion which extends from said base, and which curves to extend inclinedly with respect to said base;
a contacting portion which extends from said resiliently deformable connecting portion, and which abuts against said electrically conductive band by a resilient force of said resiliently deformable connecting portion;
a confining portion which extends perpendicularly to said base and which is formed with a confining slot; and
a tongue portion which extends from said contacting portion, which extends through said confining slot of said confining portion, and which is slidable along said confining slot for limiting movement of said contacting portion.

16. The door mount mechanism according to claim 10, wherein the angle of rotation of said rotatable component is associated with a ratio of the divided voltage to a difference between the different voltages respectively applied to said two terminal ends of said electrically conductive band.

* * * * *